United States Patent
Chung et al.

(10) Patent No.: US 8,824,389 B2
(45) Date of Patent: Sep. 2, 2014

(54) COMMUNICATIONS METHOD AND DEVICE IN A MULTI-CARRIER SYSTEM

(75) Inventors: Jae Hoon Chung, Gyeongki-do (KR); Min Seok Noh, Gyeongki-do (KR); Sung Ho Moon, Gyeongki-do (KR); Yeong Hyeon Kwon, Gyeongki-do (KR); Seung Hee Han, Gyeongki-do (KR); So Yeon Kim, Gyeongki-do (KR)

(73) Assignee: LG Electronics Inc., Seoul (KR)

( * ) Notice: Subject to any disclaimer, the term of this patent is extended or adjusted under 35 U.S.C. 154(b) by 552 days.

(21) Appl. No.: 13/123,641

(22) PCT Filed: Oct. 15, 2009

(86) PCT No.: PCT/KR2009/005954
§ 371 (c)(1),
(2), (4) Date: Apr. 11, 2011

(87) PCT Pub. No.: WO2010/044632
PCT Pub. Date: Apr. 22, 2010

(65) Prior Publication Data
US 2011/0194501 A1  Aug. 11, 2011

Related U.S. Application Data

(60) Provisional application No. 61/105,432, filed on Oct. 15, 2008, provisional application No. 61/157,910, filed on Mar. 6, 2009, provisional application No. 61/171,065, filed on Apr. 20, 2009.

(51) Int. Cl.
*H04L 5/00* (2006.01)
*H04W 72/00* (2009.01)
*H04W 72/04* (2009.01)

(52) U.S. Cl.
CPC .......... *H04L 5/0053* (2013.01); *H04W 72/042* (2013.01); *H04L 5/0007* (2013.01)
USPC ........................................................ 370/329

(58) Field of Classification Search
None
See application file for complete search history.

(56) References Cited

U.S. PATENT DOCUMENTS

| 6,584,084 B1 | 6/2003 | Barany et al. |
| 2006/0233150 A1 | 10/2006 | Cherian |
| 2008/0227449 A1* | 9/2008 | Gholmieh et al. ............ 455/434 |
| 2009/0219910 A1* | 9/2009 | Han et al. ...................... 370/343 |

FOREIGN PATENT DOCUMENTS

| KR | 10-2008-0039177 A | 5/2008 |
| WO | 2008/105273 A1 | 9/2008 |

OTHER PUBLICATIONS

International Search Report from PCT/KR2009/005954.
Office Action issued in corresponding Korean Patent Application No. 10-2011-7007332 dated Jun. 26, 2012.

* cited by examiner

*Primary Examiner* — Marcus R Smith
(74) *Attorney, Agent, or Firm* — Morgan, Lewis & Bockius LLP (57) ABSTRACT

A communication method and apparatus using multiple carriers are provided. A primary carrier is configured, and multi-carrier control information for monitoring a control channel of a secondary carrier is transmitted through the primary carrier. A user equipment monitors a control channel of the secondary carrier on the basis of the multi-carrier control information.

6 Claims, 10 Drawing Sheets

COMMUNICATIONS METHOD AND DEVICE IN A MULTI-CARRIER SYSTEM

The present application is a national stage of PCT International Application No. PCT/KR2009/005954, filed Oct. 15, 2009, and claims the benefit of U.S. Provisional Application Nos. 61/105,432, filed Oct. 15, 2008, 61/157,910, filed Mar. 6, 2009, and 61/171,065, filed Apr. 20, 2009.

TECHNICAL FIELD

The present invention relates to wireless communications, and more particularly, to a wireless communication system supporting multiple carriers.

BACKGROUND ART

Wireless communication systems are widely spread all over the world to provide various types of communication services such as voice or data. In general, the wireless communication system is a multiple access system capable of supporting communication with multiple users by sharing available system resources (e.g., bandwidth, transmit power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, etc.

In general, a wireless communication system uses one bandwidth for data transmission. For example, a $2^{nd}$ generation wireless communication system uses a bandwidth of 200 KHz to 1.25 MHz, and a $3^{rd}$ generation wireless communication system uses a bandwidth of 5 MHz to 10 MHz. To support growing transmission capacity, the 3GPP LTE or the 802.16m has recently expanded its bandwidth to 20 MHz or higher. It may be necessary to increase the bandwidth to obtain high transmission capacity. However, if a large bandwidth is supported even when a service request level is low, it may cause significantly great power consumption.

Therefore, a multiple-carrier system capable of transmitting and/or receiving broadband data by using a plurality of carriers has been introduced by defining a carrier having one bandwidth and a center frequency. By using one or more carriers, a narrowband and a broadband are supported at the same time. For example, if one carrier corresponds to a bandwidth of 5 MHz, four carriers are used to support a bandwidth of up to 20 MHz.

It may be ineffective to directly use a control channel designed by considering only one carrier to the multiple-carrier system. Therefore, there is a need for an effective design of the control channel in the multiple-carrier system.

SUMMARY OF INVENTION

Technical Problem

The present invention provides a method and apparatus for designing a control channel for multiple carriers and for performing communication through the control channel.

Technical Solution

According to an aspect of the present invention, a communication method using multiple carriers of a user equipment in a multiple-carrier system is provided. The method includes: configuring a primary carrier; acquiring multi-carrier control information for monitoring a control channel of a secondary carrier through the primary carrier; and monitoring a control channel of the secondary carrier on the basis of the multi-carrier control information.

In the aforementioned aspect of the present invention, a carrier that acquires a synchronization signal may be configured as the primary carrier. The primary carrier may be configured while a random access procedure is performed with respect to a base station. The primary carrier may be configured under the instruction of a base station.

In addition, the multi-carrier control information may include information regarding the presence or absence of the secondary carrier. The multi-carrier control information may include information regarding a resource for monitoring the control channel of the secondary carrier.

According to another aspect of the present invention, there is provided a user equipment including: a radio frequency (RF) unit for transmitting and receiving a radio signal; and a processor coupled to the RF unit. The processor configures a primary carrier, acquires multi-carrier control information for monitoring a control channel of a secondary carrier through the primary carrier, and monitors a control channel of the secondary carrier on the basis of the multi-carrier control information.

Advantageous Effects

Overload caused by blind decoding of a control channel can be reduced in a multiple-carrier system, and control signaling between multiple carriers can be clearly defined.

MODE FOR INVENTION

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advance (LTE-A) is an evolution of the 3GPP LTE.

For clarity of explanation, the following description will focus on the 3GPP LTE/LTE-A. However, the technical features of the present invention are not limited thereto.

Figure 1:
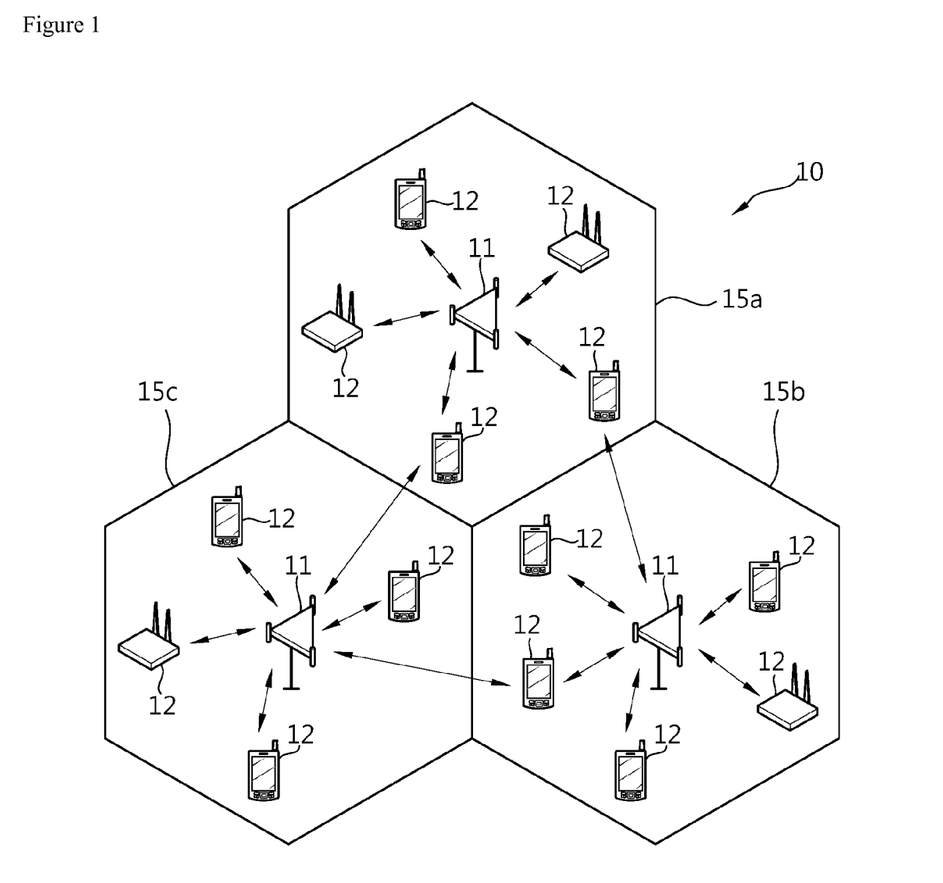
FIG. 1 shows a wireless communication system.

FIG. 1 shows a wireless communication system. Referring to FIG. 1, a wireless communication system 10 includes at least one base station (BS) 11. The BSs 11 provide communication services to specific geographical regions (generally referred to as cells) 15a, 15b, and 15c. The cell can be divided into a plurality of regions (referred to as sectors). A user equipment (UE) 12 may be fixed or mobile, and may be referred to as another terminology, such as a mobile station (MS), a user terminal (UT), a subscriber station (SS), a wireless device, a personal digital assistant (PDA), a wireless modem, a handheld device, etc. The BS 11 is generally a fixed station that communicates with the UE 12 and may be referred to as another terminology, such as an evolved node-B (eNB), a base transceiver system (BTS), an access point, etc.

Hereinafter, a downlink (DL) denotes a communication link from the BS to the UE, and an uplink (UL) denotes a communication link from the UE to the BS. In the DL, a transmitter may be a part of the BS, and a receiver may be a part of the UE. In the UL, the transmitter may be a part of the UE, and the receiver may be a part of the BS.

Figure 2:
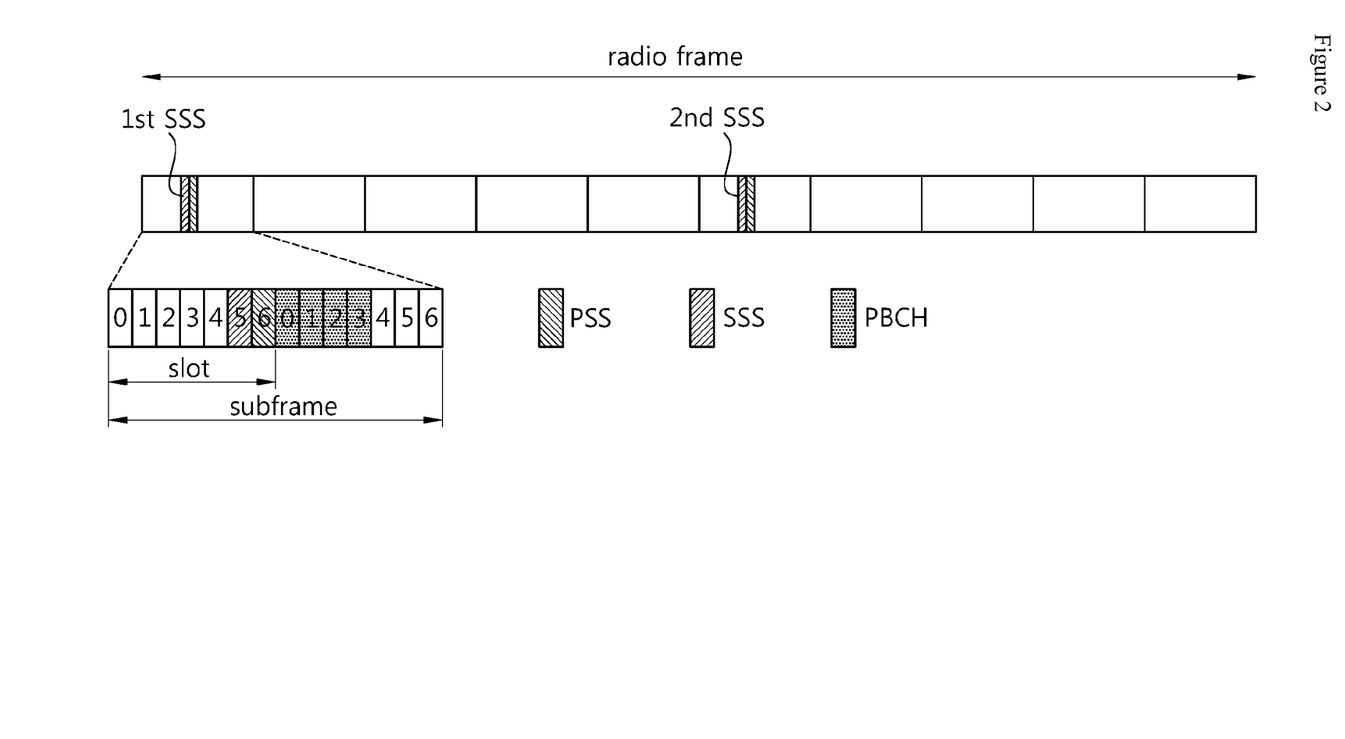
FIG. 2 shows a structure of a radio frame in $3^{rd}$ generation partnership project (3GPP) long term evolution (LTE).

FIG. 2 shows a structure of a radio frame in $3^{rd}$ generation partnership project (3GPP) long term evolution (LTE). Section 6 of the 3GPP TS 36.211 V8.4.0 (2008-09) may be incorporated herein by reference. The radio frame consists of 10 subframes, and one subframe consists of two slots. A time for transmitting one subframe is defined as a transmission time interval (TTI). For example, one subframe may have a length of 1 millisecond (ms), and one slot may have a length of 0.5 ms.

One slot may include a plurality of orthogonal frequency division multiplexing (OFDM) symbols in a time domain. Since the 3GPP LTE uses OFDMA in DL transmission, the OFDM symbol is for representing one symbol duration, and can be referred to as other terms. For example, the OFDM symbol can also be referred to as an SC-FDMA symbol when SC-FDMA is used in UL as the multiple access scheme. Although it is described herein that one slot includes 7 OFDM symbols, the number of OFDM symbols included in one slot may change depending on a cyclic prefix (CP) length. According to 3GPP TS 36.211, in case of a normal CP, one subframe includes 7 OFDM symbols, and in case of an extended CP, one subframe includes 6 OFDM symbols. The radio frame structure is for exemplary purposes only, and thus the number of subframes included in the radio frame and the number of slots included in the subframe may change variously.

A primary synchronization signal (PSS) is transmitted in last OFDM symbols of a $1^{st}$ slot and an $11^{th}$ slot. The PSS is used to attain OFDM symbol synchronization or slot synchronization, and is in association with a physical cell identify (ID). A primary synchronization code (PSC) is a sequence used for the PSS. There are three PSCs in the 3GPP LTE. One of the three PSCs is transmitted using the PSS according to the cell ID. The same PSC is used for each of the last OFDM symbols of the $1^{st}$ slot and the $11^{th}$ slot.

A secondary synchronization signal (SSS) includes a $1^{st}$ SSS and a $2^{nd}$ SSS. The $1^{st}$ SSS and the $2^{nd}$ SSS are transmitted in an OFDM symbol adjacent to an OFDM symbol in which the PSS is transmitted. The SSS is used to attain frame synchronization. The SSS is used to attain a cell ID together with the PSS. The $1^{st}$ SSS and the $2^{nd}$ SSS use different secondary synchronization codes (SSCs). If the 1 SSS and the $2^{nd}$ SSS each include 31 subcarriers, sequences of two SSCs with a length of 31 are respectively used for the $1^{st}$ SSS and the $2^{nd}$ SSS.

A physical broadcast channel (PBCH) is transmitted in first four OFDM symbols in a $2^{nd}$ slot of a $1^{st}$ subframe. The PBCH carries system information necessary for communication between a UE and a BS. The system information transmitted through the PBCH is referred to as a master information block (MIB). System information transmitted through a physical downlink control channel (PDCCH) is referred to as a system information block (SIB).

Figure 3:
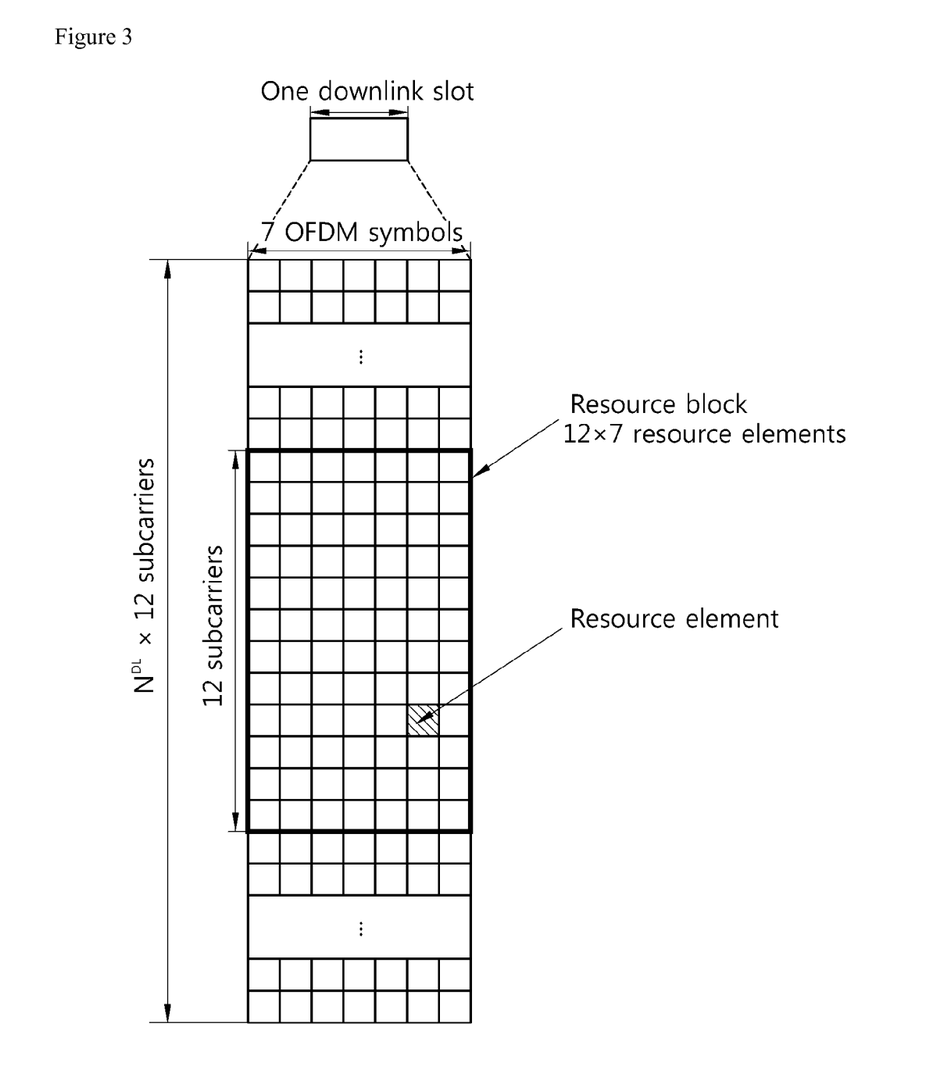
FIG. 3 shows an example of a resource grid for one downlink slot.

FIG. 3 shows an example of a resource grid for one DL slot. The DL slot includes a plurality of OFDM symbols in a time domain. It is described herein that one DL slot includes 7 OFDM symbols and one resource block includes 12 subcarriers for exemplary purposes only, and the present invention is not limited thereto. Each element on the resource grid is referred to as a resource element, and one resource block includes 12×7 resource elements. The number $N^{DL}$ of resource blocks included in the DL slot depends on a DL transmission bandwidth determined in a cell.

Figure 4:
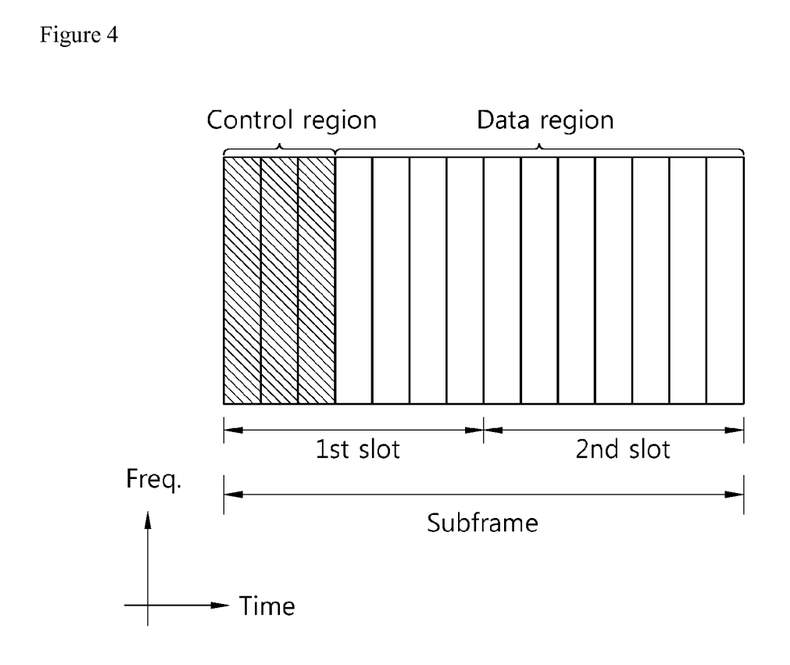
FIG. 4 shows a structure of a downlink subframe.

FIG. 4 shows a structure of a DL subframe. The subframe includes two slots in a time domain. A maximum of three OFDM symbols located in a front portion of a $1^{st}$ slot in a subframe correspond to a control region to which control channels are assigned. The remaining OFDM symbols correspond to a data region to which a physical downlink shared channel (PDSCH) is assigned.

Examples of DL control channels used in the 3GPP LET include a physical control format indicator channel (PCFICH), a physical downlink control channel (PDCCH), a physical hybrid-ARQ indicator channel (PHICH), etc. The PCFICH transmitted in a $1^{st}$ OFDM symbol of a subframe carries information regarding the number of OFDM symbols (i.e., a size of a control region) used for transmission of control channels in the subframe. Control information transmitted through the PDCCH is referred to as downlink control information (DCI). The DCI transmits UL resource assignment information, DL resource assignment information, a UL transmit power control (TPC) command for any UE groups, etc. The PHICH carries an acknowledgement (ACK)/not-acknowledgement (NACK) signal for a UL hybrid automatic repeat request (HARQ). That is, the ACK/NACK signal for UL data transmitted by a UE is transmitted through the PHICH.

Control information transmitted through the PDCCH is referred to as downlink control information (DCI). The following table shows the DCI according to a DCI format.

TABLE 1

| DCI Format | Description |
|---|---|
| DCI format 0 | used for the scheduling of PUSCH |
| DCI format 1 | used for the scheduling of one PDSCH codeword |
| DCI format 1A | used for the compact scheduling of one PDSCH codeword and random access procedure initiated by a PDCCH order |
| DCI format 1B | used for the compact scheduling of one PDSCH codeword with precoding information |
| DCI format 1C | used for very compact scheduling of one PDSCH codeword |
| DCI format 1D | used for the compact scheduling of one PDSCH codeword with precoding and power offset information |
| DCI format 2 | used for scheduling PDSCH to UEs configured in closed-loop spatial multiplexing mode |
| DCI format 2A | used for scheduling PDSCH to UEs configured in open-loop spatial multiplexing mode |
| DCI format 3 | used for the transmission of TPC commands for PUCCH and PUSCH with 2-bit power adjustments |
| DCI format 3A | used for the transmission of TPC commands for PUCCH and PUSCH with single bit power adjustments |

A DCI format 0 indicates UL resource assignment information (or UL grant). DCI formats 1, 1A, 1B, 1C, 1D, 2, and 2A indicate DL resource assignment information (or DL grant). DCI formats 3 and 3A indicate a UL transmit power control (TPC) command for any UE groups.

The following table shows information elements included in the DCI format 0 that is the UL grant. Section 5.3.3.1 of the 3GPP TS 36.212 V8.4.0 (2008-09) "Technical Specification Group Radio Access Network; Evolved Universal Terrestrial Radio Access (E-UTRA); Multiplexing and channel coding (Release 8)" may be incorporated herein by reference.

TABLE 2

Figure 5:
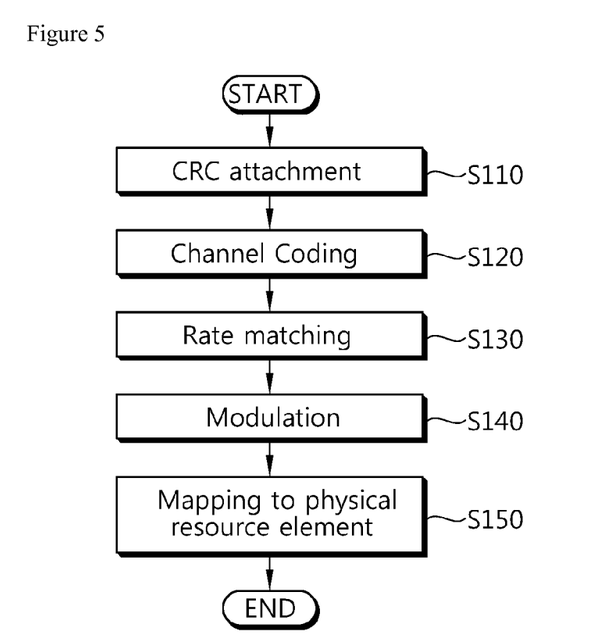
FIG. 5 is a flowchart showing a process of configuring a physical downlink control channel (PDCCH).

Flag for format0/format1A differentiation - 1 bit
Hopping flag - 1 bit
Resource block assignment and hopping resource allocation -
$\lceil \log_2(N_{RB}^{UL}(N_{RB}^{UL} + 1)/2) \rceil$ bits
   For PUSCH hopping:
      $N_{UL\_hop}$ bits are used to obtain the value of $\tilde{n}_{PRB}(i)$
      $(\lceil \log_2(N_{RB}^{UL}(N_{RB}^{UL} + 1)/2) \rceil) - N_{UL\_hop})$ bits provide the resource allocation of the first slot in the UL subframe
   For non-hopping PUSCH:
      $(\lceil \log_2(N_{RB}^{UL}(N_{RB}^{UL} + 1)/2) \rceil)$ bits provide the resource allocation of the first slot in the UL subframe
Modulation and coding scheme and redundancy version - 5 bits
New data indicator - 1 bit
TPC command for scheduled PUSCH - 2 bits
Cyclic shift for DM RS - 3 bits
UL index (2 bits, this field just applies to TDD operation)
CQI request - 1 bit FIG. 5 is a flowchart showing a procedure of constructing a PDCCH. In step S110, a BS determines a PDCCH format according to DCI to be transmitted to a UE, and attaches a cyclic redundancy check (CRC) to control information. A unique identifier (referred to as a radio network temporary identifier (RNTI)) is masked to the CRC according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging indication identifier (e.g., paging-RNTI (P-RNTI)) may be masked to the CRC. If the PDCCH is for system information, a system information identifier (e.g., system information-RNTI (SI-RNTI)) may be masked to the CRC. To indicate a random access response that is a response for transmission of a random access preamble of the UE, a random access-RNTI (RA-RNTI) may be masked to the CRC. The following table shows an example of identifiers masked to the PDCCH.

TABLE 3

| Type | Identifier | Description |
|---|---|---|
| UE-specific | C-RNTI | used for the UE corresponding to the C-RNTI. |
| Common | P-RNTI | used for paging message. |
| | SI-RNTI | used for system information (It could be differentiated according to the type of system information). |
| | RA-RNTI | used for random access response (It could be differentiated according to subframe or PRACH slot index for UE PRACH transmission). |
| | TPC-RNTI | used for uplink transmit power control command (It could be differentiated according to the index of UE TPC group). |

When the C-RNTI is used, the PDCCH carries control information for a specific UE, and when other RNTIs are used, the PDCCH carries common control information received by all or a plurality of UEs in a cell.

In step S120, channel coding is performed on the DCI attached with the CRC to generate coded data. In step S130, a rate matching is performed according to the number of CCEs assigned to the PDCCH format. In step S140, the coded data is modulated to generate modulation symbols. In step S150, the modulation symbols are mapped to physical resource elements.

A plurality of PDCCHs can be transmitted in one subframe. The UE monitors the plurality of PDCCHs in each subframe. Monitoring implies that the UE attempts decoding of each PDCCH according to a to-be-monitored PDCCH format. The BS does not provide the UE with information indicating where a corresponding PDCCH is located in a control region allocated in a subframe. Therefore, the UE monitors a set of PDCCH candidates in the subframe to find a PDCCH of the UE. This is referred to as blind decoding. For example, the UE detects a PDCCH having the DCI of the UE if a CRC error is not detected as a result of de-masking the C-RNTI of the UE from a corresponding PDCCH.

A search space is defined as a space for searching for a PDCCH in a control region. A set of PDCCH candidates to be monitored is defined based on the search space. When an aggregation of all CCEs for the PDCCH is defined as a CCE aggregation in one subframe, the search space is an aggregation of contiguous CCEs beginning at a specific start point in the CCE aggregation according to a CCE aggregation level. The CCE aggregation level is a CCE unit for searching for the PDCCH, and a size thereof is defined by the number of contiguous CCEs. The CCE aggregation level denotes the number of CCEs used for transmission of the PDCCH. The search space is defined according to the CCE aggregation level. A position of each PDCCH candidate differs in the search space according to each CCE aggregation level.

The search space can be classified into a common search space and a UE-specific search space. The common search space is monitored by all UEs within a cell. The UE-specific search space is monitored by a specific UE. The UE monitors the common search space and/or the UE-specific search space according to control information to be received. The number of CCE aggregation levels supported by the common search space is less than the number of CCE aggregation levels supported by the UE-specific search space. The common search space and the UE-specific search space may overlap with each other.

To receive DL data, the UE first receives a DL resource assignment through the PDCCH. Upon successfully detecting the PDCCH, the UE reads DCI on the PDCCH. The DL data is received through the PDSCH by using the DL resource assignment included in the DCI. Further, to transmit UL data, the UE first receives a UL resource assignment through the PDCCH. Upon successfully detecting the PDCCH, the UE reads DCI on the PDCCH. The UL data is transmitted through the PUSCH by using the UL resource assignment included in the DCI.

Figure 6:
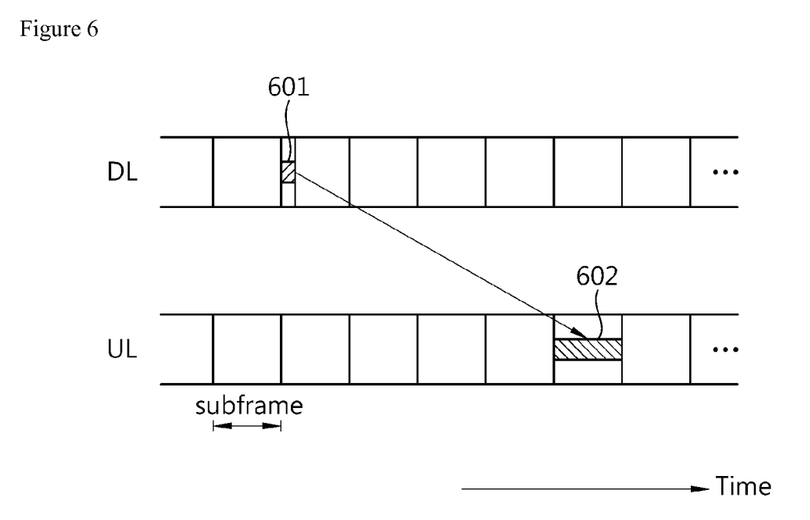
FIG. 6 shows an example of transmitting uplink data.

FIG. 6 shows an example of transmitting UL data. A UE transmits UL data through a PUSCH 602 indicated by a PDCCH 601. The UE monitors the PDCCH 601 in a DL subframe, and receives a DCI format 0, that is a UL resource assignment, through the PDCCH 601. The UE transmits UL data through the PUSCH 602 constructed based on the UL resource assignment.

Figure 7:
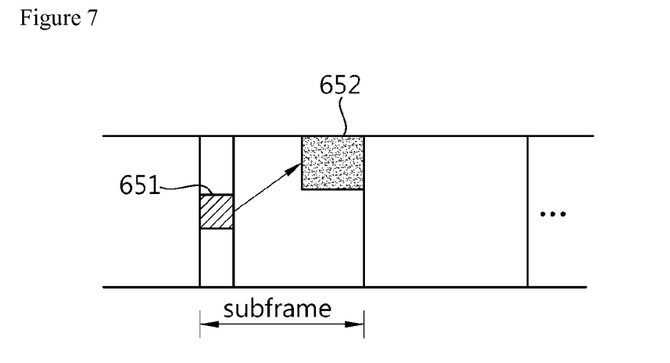
FIG. 7 shows an example of receiving downlink data.

FIG. 7 shows an example of receiving DL data. A UE receives DL data through a PDSCH 652 indicated by a PDCCH 651. The UE monitors the PDCCH 651 in a DL subframe, and receives DL resource assignment information through the PDCCH 651. The UE receives DL data through the PDSCH 652 indicated by the DL resource assignment information.

Figure 8:
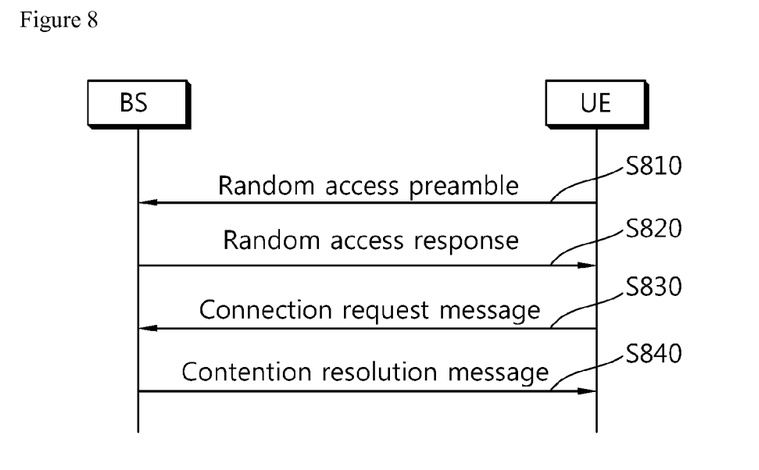
FIG. 8 is a flowchart showing a random access procedure.

FIG. 8 is a flowchart showing a random access procedure. The random access procedure can be performed when a UE acquires UL synchronization with a BS or when a UL radio resource is allocated to the UE. In step S810, the UE transmits a random access preamble randomly selected from a random access set, to which a plurality of random access preambles belong, to the BS through a physical random access channel (PRACH). The random access set may include 64 random access preambles, and information for generating the random access set may be reported by the BS to the UE as a part of system information.

In step S820, upon receiving the random access preamble, the BS transmits a random access response to the UE through a downlink shared channel (DL-SCH). The random access response can include time alignment information for alignment of UL time synchronization, UL radio resource assignment information, a random access preamble identifier, a temporal C-RNTI (cell-radio network temporary identifier), etc. The time alignment information is used by the UE to adjust UL synchronization. The random access preamble identifier is an identifier for the random access preamble received by the BS. The random access response is indicated by a random access identifier (i.e., a random access-radio network temporary identifier (RA-RNTI)) through a PDCCH.

In step S830, the UE transmits a connection request message to the BS through an uplink shared channel (UL-SCH) by using the UL radio resource assignment information included in the random access response.

In step S840, upon receiving the connection request message, the BS transmits a contention resolution message. When the UE successfully receives the contention resolution message, contention is resolved and thus an RRC connection is established. Then, the random access procedure is completed.

Although the random access preamble is randomly selected from the random access set including 64 random access preambles, a plurality of UEs can simultaneously transmit the same random access preambles. This is called contention. In practice, the BS and each UE cannot detect occurrence of contention. After successfully receiving the contention resolution message, the UE can know that contention is resolved and thus the UE successfully accesses to the BS. If the UE does not receive the contention resolution message during a predetermined time period, the UE transmits a new random access preamble by regarding the random access as a failure.

Now, a multiple-carrier system will be described.

A 3GPP LTE system supports a case where a DL bandwidth is set differently from a UL bandwidth under the assumption that one carrier is used. This implies that the 3GPP LTE is supported only when the DL bandwidth is equal to or different from the UL bandwidth in a condition where one carrier is defined for each of the DL and the UL. For example, the 3GPP LTE system can support up to 20 MHz, and the UL bandwidth and the DL bandwidth may be different from each other, but in this case, only one carrier is supported for the UL and the DL.

Spectrum aggregation (also referred to as bandwidth aggregation or carrier aggregation) is for supporting a plurality of carriers. The spectrum aggregation is introduced to support an increasing throughput, to prevent cost rising caused by introduction of a broadband radio frequency (RF) device, and to ensure compatibility with a legacy system. For example, when 5 carriers are assigned with a granularity of a carrier unit having a bandwidth of 20 MHz, up to 100 MHz can be supported.

The spectrum aggregation can be classified into contiguous spectrum aggregation achieved between consecutive carriers in a frequency domain and non-contiguous spectrum aggregation achieved between discontinuous carriers. The number of aggregated carriers and/or the bandwidth of the carriers may be set differently between the DL and the UL. Symmetric aggregation is achieved when the number of DL carriers is equal to the number of UL carriers. Asymmetric aggregation is achieved when the number of DL carriers is different from the number of UL carriers.

Multiple carriers may have different sizes (i.e., bandwidths). For example, when 5 carriers are used to configure a band of 70 MHz, the band can be configured as 5 MHz carrier (carrier #0)+20 MHz carrier (carrier #1)+20 MHz carrier (carrier #2)+20 MHz carrier (carrier #3)+5 MHz carrier (carrier #4). Symmetric aggregation is achieved when the bandwidth of the DL carrier is identical to the bandwidth of the UL carrier. Asymmetric aggregation is achieved when the bandwidth of the DL carrier is different from the bandwidth of the UL carrier.

Hereinafter, a multiple-carrier system is a system supporting multiple carriers on the basis of spectrum aggregation. The multiple-carrier system can use contiguous spectrum aggregation and/or non-contiguous spectrum aggregation, and also can use either symmetric aggregation or asymmetric aggregation. A different radio access technology (RAT) is applicable to each carrier. For example, 3GPP LTE is applicable to first and second carriers, and IEEE 802.16 is applicable to a third carrier.

Carriers can be divided into fully configured carriers and partially configured carriers according to directivity of the carriers. The fully configured carriers are bidirectional carriers and are used to transmit and/or receive all control signals and data. The partially configured carriers are unidirectional carriers and are used to transmit or receive DL data or UL data.

Carriers can be divided into a primary carrier and a secondary carrier according to whether a UE is used to transmit or receive essential control information. The primary carrier is a carrier on which the primary control information is transmitted or received. The secondary carrier is a carrier on which control information and/or data are transmitted or received based on the essential control information from the primary carrier. The essential control information transmitted on the primary carrier will be described later. The primary carrier may also be referred to as a reference carrier or an anchor carrier. One or a plurality of primary carriers may be provided.

The UE may use only one primary carrier, or may use one or more secondary carriers together with the primary carrier. The primary carrier may be a fully configured carrier. The essential control information is exchanged between the BS and the UE by using the primary carrier. The secondary carrier may be a fully configured carrier or a partially configured carrier. The secondary carrier is assigned at the request of the UE or under the instruction of the BS. The primary carrier may be used for network entry of the UE and/or assignment of the secondary carrier. Rather than being fixed to a specific carrier, the primary carrier may be selected from the fully configured carriers. A carrier configured as the second carrier may be changed to the primary carrier.

Figure 9:
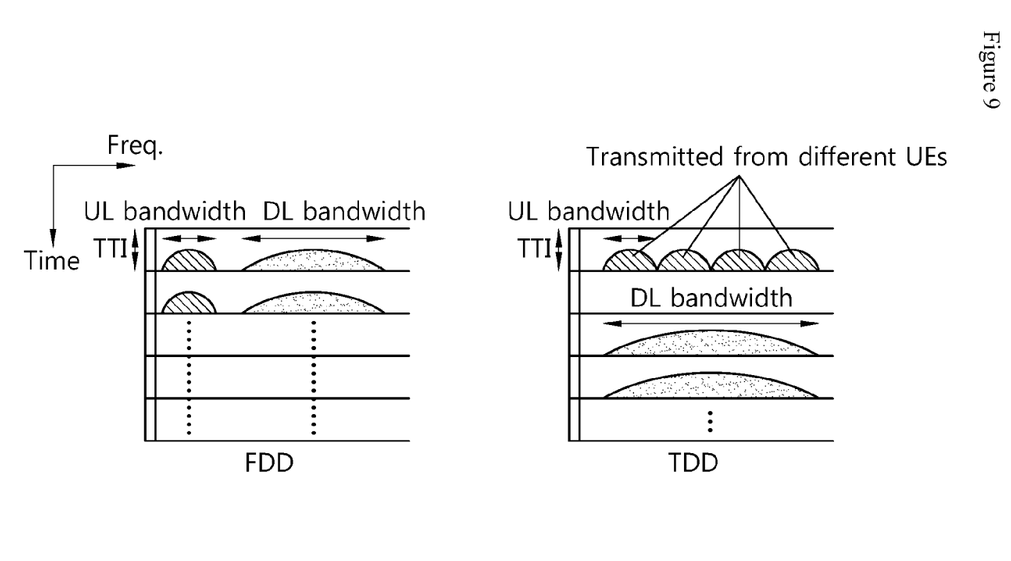
FIG. 9 shows an example of a structure in which uplink/downlink bandwidths are asymmetric in frequency division duplex (FDD) and time division duplex (TDD) in a multiple-carrier system.

FIG. 9 shows an example of a structure in which UL/DL bandwidths are asymmetric in frequency division duplex (FDD) and time division duplex (TDD) in a multiple-carrier system. In the FDD, UL transmission and DL transmission are achieved in different frequency bands. In the TDD, UL transmission and DL transmission are achieved in different TTIs (or time slots or subframes). Although it is shown herein that a DL bandwidth is greater than a UL bandwidth in the FDD, the UL bandwidth can also be greater than the DL bandwidth. A plurality of carriers may be used in each bandwidth. It is shown herein that, in the TDD, 4 carriers are used in the UL bandwidth and one carrier is used in the DL bandwidth.

Figure 10:
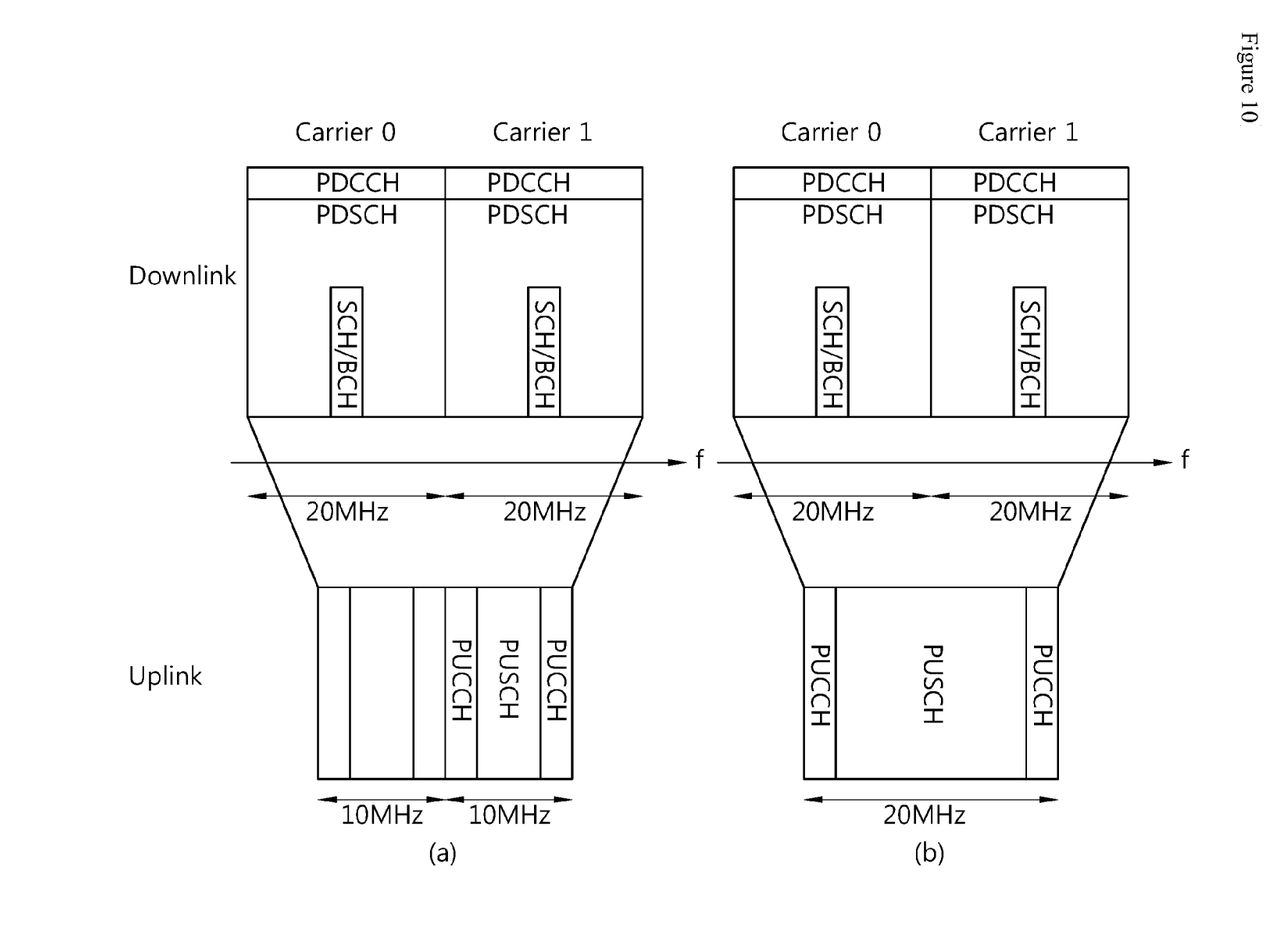
FIG. 10 shows another example of an uplink/downlink structure in a multiple-carrier system.

FIG. 10 shows another example of a UL/DL structure in a multiple-carrier system. In FIG. 10(a), the number of UL carriers is equal to the number of DL carriers, but different bandwidths are used between the UL and the DL. In FIG. 10(b), the number of UL carriers is different from the number of DL carriers, but the same bandwidth is used between the UL and the DL.

In the conventional 3GPP LTE, a control channel is designed without consideration of multiple carriers. It may be ineffective when the conventional control channel structure is directly applied to the multiple-carrier system. For example, excessive power consumption may be caused when a UE monitors a PDCCH for all carriers.

In order to prevent the UE from performing blind decoding on the PDCCH in an excessive number of times in the multiple-carrier system, a primary carrier may be configured in a UE-specific manner, a cell-specific manner, and/or a BS-specific manner, and the remaining available carriers may be configured as secondary carriers.

The primary carrier is used to exchange information on multi-carrier capability and available secondary carriers between the UE and the BS. The primary carrier may also be used to transmit information on secondary carrier allocation (or activation) and/or the PDCCH transmitted on the secondary carrier. For example, the information on the secondary carrier activation, the presence or absence of the PDCCH in the secondary carrier and/or a search space for monitoring of the PDCCH may be reported by the BS to the UE through the primary carrier.

The primary carrier may be configured in a UE-specific manner, a UE group-specific manner, a relay station (RS)-specific manner, an RS group-specific manner, a cell-specific manner, a BS-specific manner, or a multi-cell (or BS)-specific manner. When the primary carrier is configured in a UE-specific manner, the primary carrier can be uniquely configured for each UE, and thus each UE can configure a different carrier as the primary carrier. When the primary carrier is configured in a cell-specific manner, a unique carrier is configured for each cell, and thus all UEs in a cell can configure the same carrier as the primary carrier. When the primary carrier is configured in a UE (or RS) or UE group (or RS group)-specific manner, primary carrier configuration information may be reported to the UE (or RS) as information on RRC signaling of the UE (or RS). A carrier configured as the primary carrier may be fixed, or another carrier may be reconfigured or changed to the primary carrier through additional signaling or a predetermined rule.

The number of primary carriers will be assumed to be one hereinafter, but the present invention is not limited thereto, and thus a plurality of primary carriers may be configured. In addition, the primary carrier may be configured in a UE/RS/cell/BS-specific manner.

Figure 11:
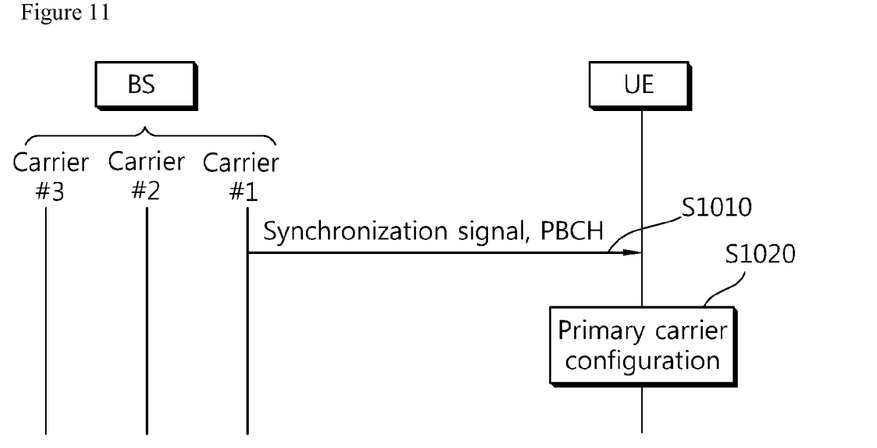
FIG. 11 shows an example of primary carrier configuration.

FIG. 11 shows an example of primary carrier configuration. Available DL carriers are carriers #1, #2, and #3. A BS transmits a synchronization signal (i.e., PSS and SSS) and a PBCH through at least one carrier among the carriers #1, #2, and #3. In step S1010, a UE receives the synchronization signal and the PBCH through the carrier #1. Each carrier may use the same synchronization signal, or may use a different synchronization signal. Alternatively, only some carriers may transmit the synchronization signal. As described above, the UE acquires a cell ID through the PSS and the SSS. When each carrier uses a different PSS and SSS, the UE can attain a different cell ID for each carrier. Therefore, a unique primary carrier can be configured for each cell. For example, if the number of available carriers is N, the UE may configure the primary carrier according to an equation of (the acquired cell ID % N). Herein, '%' denotes a modular operation.

In step S1020, the UE configures the primary carrier. In one embodiment, the UE may configure the carrier #1 that receives the synchronization signal and the PBCH as a primary DL carrier. The primary UL carrier used by the UE for initial access may be a UL carrier corresponding to the carrier #1. In another embodiment, the UE may configure the primary carrier on the basis of UL/DL carrier configuration information included in an MIB on the PBCH.

When the primary carrier is configured in a UE (or RS)-specific manner, the UE (or RS) may configure a carrier that receives the synchronization signal and/or the PBCH as the primary carrier.

When the primary carrier is configured in a cell- or BS-specific manner, the UE may configure the primary carrier by using a cell ID acquired from the synchronization signal or carrier configuration information on the PBCH.

The UL primary carrier may be configured based on the DL primary carrier configured by using the synchronization and/or PBCH. The UL primary carrier may be used in PUCCH (e.g., ACK/NACK or CQI) transmission corresponding to the DL primary carrier. The UL carrier corresponding to the DL primary carrier may be used as the primary carrier. For this, one-to-one mapping or one-to-many mapping may be defined between the UL carrier and the DL carrier so that the UL carrier and the DL carrier are linked to each other. Alternatively, information on the PBCH includes configuration information of the UL primary carrier, and the UL primary carrier may be configured through reception of the PBCH.

Figure 12:
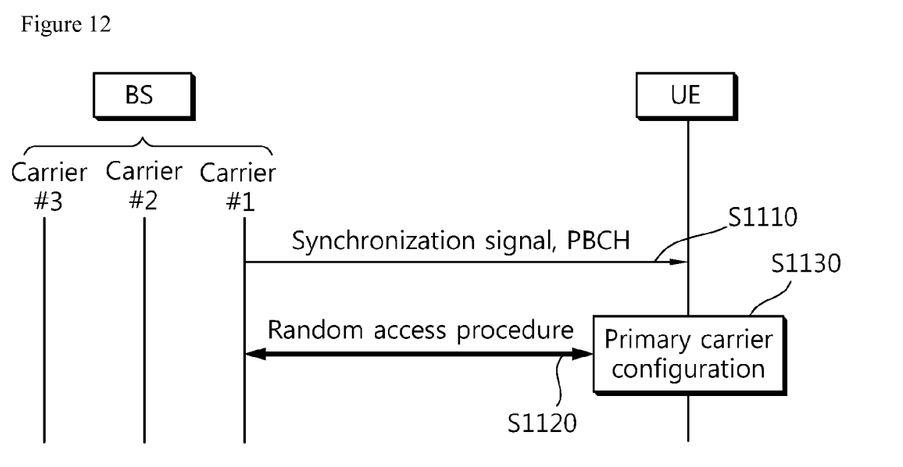
FIG. 12 shows another example of primary carrier configuration.

FIG. 12 shows another example of primary carrier configuration. In step S1110, a UE receives a synchronization signal and a PBCH through a carrier #1. In step S1120, the UE starts a random access procedure. A UL carrier used in the random access procedure may be a carrier corresponding to the carrier #1, or may be acquired from system information on the PBCH.

In step S1130, the UE configures a primary carrier during the random access procedure. The UE may configure the primary carrier on the basis of information included in a random access response and/or a contention resolution message. The random access response and/or the contention resolution message may include carrier configuration information for the primary carrier configuration. Alternatively, the UE may configure the primary carrier on the basis of a UE identifier (i.e., C-RNTI) included in the random access response and/or the contention resolution message. For example, if N denotes the number of available carriers, the UE can determine the primary carrier according to an equation of (C-RNTI % N). Herein, '%' denotes a modular operation. A special transmission/reception operation performed by means of the primary carrier configured in the random access procedure can be applied after the random access procedure.

When the primary carrier is configured in a cell- or BS-specific manner, the UE can configure the primary carrier by using information included in the random access response or the contention resolution message.

A UL primary carrier may be configured. The UL primary carrier may be used to transmit a connection request message or a PUCCH for a DL primary carrier. The UL primary carrier may be a carrier for transmitting a random access preamble, or a UL carrier corresponding to the DL primary carrier may be used as the UL primary carrier. Alternatively, information on a PBCH may include configuration information of the UL primary carrier, and the UL primary carrier may be configured through reception of the PBCH.

Figure 13:
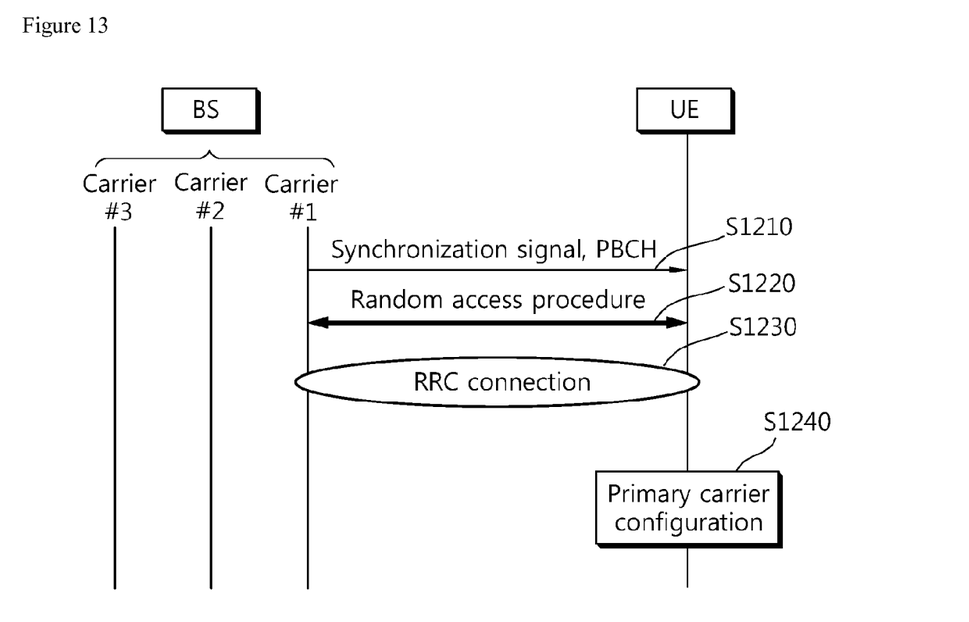
FIG. 13 shows another example of primary carrier configuration.

FIG. 13 shows another example of primary carrier configuration. In step S1210, a UE receives a synchronization signal and a PBCH through a carrier #1. In step S1220, the UE starts a random access procedure. A UL carrier used in the random access procedure may be a carrier corresponding to the carrier #1, or may be acquired from system information on the PBCH. In step S1230, the UE completes the random access procedure and establishes a radio resource control (RRC) connection. In step S1240, the UE configures a primary carrier. The UE may acquire carrier configuration information by using an RRC message after establishing the RRC connection or by using an SIB on a PDCCH. In this case, the RRC message may include UE-specific information, or may include cell common information. In order to configure the primary carrier in a cell- or BS-specific manner, carrier configuration information may be transmitted by using a cell-specific message or a BS-specific message.

The carrier configuration information may include a bitmap or an index of a carrier configured to the primary carrier. In this case, the bitmap or the index of the carrier may be expressed by a physical index or logical index of the carrier. For example, as shown in Table 4 below, it is assumed that 8 carriers are present in total in a system, and the carriers are indexed from 0 to 7 in sequence.

TABLE 4

|  | Physical index | | | | | | | |
| --- | --- | --- | --- | --- | --- | --- | --- | --- |
|  | 0 | 1 | 2 | 3 | 4 | 5 | 6 | 7 |
| Logical index |  |  | 0 | 1 | 2 | 3 |  |  |

In this case, if carriers that can be used between a BS and a UE are four carriers having physical indices 2 to 5, the four available carriers are relatively re-indexed from 0 to 3. For example, if a carrier having a logical index 1 (i.e., a carrier having a physical index 3) is configured as the primary carrier, carrier configuration information includes the logical index 1. This can be expressed by a bitmap '0100' or '1011'. Since a small number of bits are required when it is expressed in the logical index, signaling overhead can be decreased.

A UL primary carrier may be configured by using carrier configuration information. The UL primary carrier may be used in transmission of a connection request message or a PUCCH corresponding to a DL primary carrier. For instance, the UL primary carrier may be randomly defined by the UE. For example, a carrier on which the UE transmits a random access preamble may be defined as the UL primary carrier. For another example, the UE may configure a UL carrier corresponding to the DL primary carrier as the UL primary carrier. The DL primary carrier is configured by using carrier configuration information transmitted through an RRC message or the like. A UL carrier linked to the DL primary carrier may be configured as the UL primary carrier. A linkage between a DL carrier and a UL carrier may be pre-defined. For another example, carrier configuration information included in the RRC message, SIB, or MIB may include information on configuration of the UL primary carrier. That is, the carrier configuration information includes configuration information of the DL primary carrier and the UL primary carrier. The UL/DL primary carrier may be configured in a format of a bitmap or index of the DL carrier and a bitmap or index of the UL carrier. The index or the bitmap may be based on the aforementioned physical index or logical index. If UL carrier configuration information is included in a state where the linkage between the DL carrier and the UL carrier is defined, the UE may configure the UL primary carrier on the basis of UL carrier configuration information while overriding the linkage between the DL carrier and the UL carrier.

Figure 14:
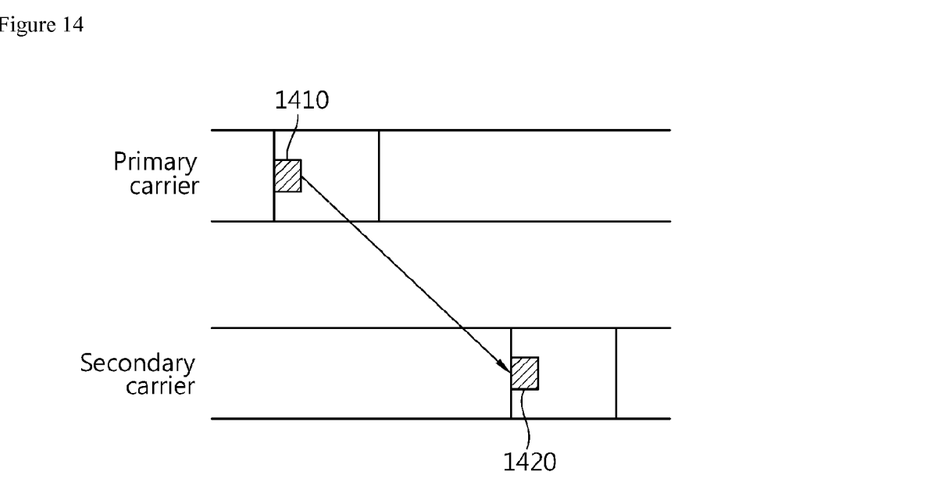
FIG. 14 shows control information exchange between a primary carrier and a secondary carrier.

FIG. 14 shows control information exchange between a primary carrier and a secondary carrier. In order to reduce overhead caused by PDCCH monitoring in the primary carrier and the secondary carrier, multi-carrier control information 1410 may be transmitted through the primary carrier. The multi-carrier control information 1410 may be transmitted through a PDCCH or another control channel of the primary carrier. The multi-carrier control information 1410 may be included in an MIB or SIB as a part of system information. The multi-carrier control information 1410 includes information required for data reception and/or monitoring of a PDCCH 1420 in the secondary carrier.

The multi-carrier control information 1410 may be transmitted in every subframe, or may be periodically transmitted with an interval of m subframes. The multi-carrier control information 1410 may be non-periodically transmitted by a BS, or may be transmitted at the request of a UE.

When the multi-carrier control information 1410 is transmitted through the PDCCH, a dedicated RNTI for CRC masking can be defined to distinguish it from another DCI. The PDCCH using the dedicated RNTI may be defined in a common search space or a UE-specific space. The multi-carrier control information 1410 can be classified into UL multi-carrier control information and DL multi-carrier control information.

The multi-carrier control information 1410 may be transmitted by using a specific control information transmission resource on a subframe without having to use blind decoding. For example, the multi-carrier control information 1410 is transmitted by using a resource block predefined in a first OFDM symbol of the subframe. The reason above is to reduce overhead caused when the UE monitors the multi-carrier control information 1410.

The multi-carrier control information 1410 includes information required for data reception and/or monitoring of the PDCCH in the secondary carrier. More specifically, the multi-carrier control information 1410 transmitted in an $n^{th}$ subframe through the primary carrier may include at least one of the following fields.

(1) The presence/absence of the secondary carrier used in DL and/or UL transmission in an $(n+k)^{th}$ subframe (or activation/inactivation of the secondary carrier). Herein, it is assumed that k≥0.

(2) The secondary carrier used in DL and/or UL transmission in the $(n+k)^{th}$ subframe. It can be expressed by a bitmap or index of the secondary carrier.

(3) The presence/absence of the PDCCH of the primary carrier and/or the secondary carrier used in DL and/or UL transmission in the $(n+k)^{th}$ subframe.

(4) A DCI format of the PDCCH of the primary carrier and/or the secondary carrier used in DL and/or UL transmission in the $(n+k)^{th}$ subframe.

(5) Monitoring information for PDCCH monitoring of the primary carrier and/or the secondary carrier used in DL and/or UL transmission in the $(n+k)^{th}$ subframe. For example, the monitoring information may include a start point for PDCCH monitoring and/or the number of candidate PDCCHs to be monitored. Alternatively, the monitoring information may include a resource for PDCCH monitoring, e.g., a location or size of a CCE zone for PDCCH monitoring, a CCE index (i.e., a lowest CCE index or a highest CCE index), and/or a CCE aggregation level. Alternatively, the monitoring information may include whether a search space for the PDCCH monitoring is a common search space or a UE-specific search space. When the UE performs PDCCH monitoring in the secondary carrier by using the monitoring information, the number of blind decoding attempts can be decreased and power consumption can also be decreased.

Meanwhile, the BS may report information on a carrier, on which a PDCCH and/or another control channel (i.e., PHICH, etc.) are not transmitted, to the UE through a specific carrier. This information may be transmitted through MIB, SIB, RRC signaling and/or PDCCH signaling. Among multiple carriers, some carriers may be used only for data transmission. Therefore, there is an advantage in that overhead caused by PDCCH monitoring is removed, and a resource which was used for a control channel (control region) can be entirely allocated for data transmission. Accordingly, a data transfer rate can be increased when a carrier to which the control channel is not allocated is defined and when the carrier is signaled to the UE.

A PCFICH is used to report a size of a control region in a subframe (i.e., the number of OFDM symbols of the PDCCH) to the UE. For one example, the PCFICH may be used for each carrier so that the size of the control region is defined differently for each carrier. For another example, when the PCFICH is transmitted through a primary carrier, a secondary carrier may directly use a PCFICH value of the primary carrier, or may determine a size of its control region on the basis of the PCFICH value of the primary carrier according to a pre-defined rule.

Figure 15:
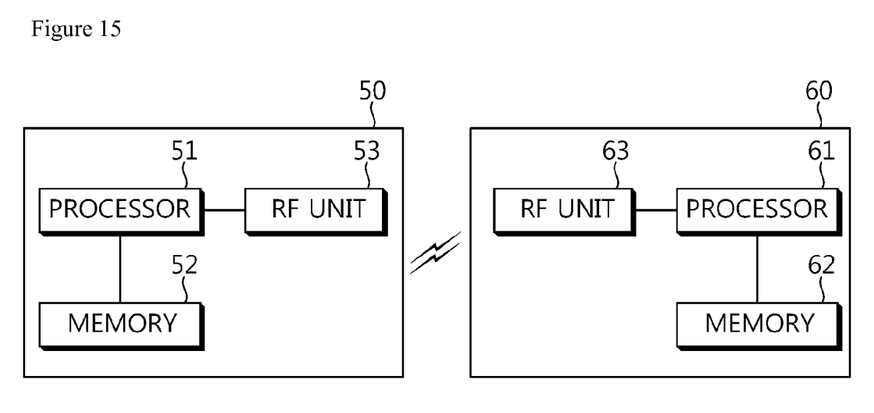
FIG. 15 is a block diagram showing a wireless communication system for implementing an embodiment of the present invention.

FIG. 15 is a block diagram showing a wireless communication system for implementing an embodiment of the present invention. A BS 50 includes a processor 51, a memory 52, and a radio frequency (RF) unit 53. The processor 51 implements the proposed functions, procedures, and/or methods. A multi-carrier function can be implemented by the processor 51. The memory 52 is coupled to the processor 51, and stores a variety of information for driving the processor 51. The RF unit 53 is coupled to the processor 51, and transmits and/or receives a radio signal. A UE 60 includes a processor 61, a memory 62, and an RF unit 63. The processor 61 implements the proposed functions, procedures, and/or methods. A multi-carrier function can be implemented by the processor 61. The memory 62 is coupled to the processor 61, and stores a variety of information for driving the processor 61. The RF unit 63 is coupled to the processor 61, and transmits and/or receives a radio signal.

The processors 51 and 61 may include an application-specific integrated circuit (ASIC), a separate chipset, a logic circuit, and/or a data processing unit. The memories 52 and 62 may include a read-only memory (ROM), a random access memory (RAM), a flash memory, a memory card, a storage medium, and/or other equivalent storage devices. The RF units 53 and 63 may include a base-band circuit for processing a radio signal. When the embodiment of the present invention is implemented in software, the aforementioned methods can be implemented with a module (i.e., process, function, etc.) for performing the aforementioned functions. The module may be stored in the memories 52 and 62 and may be performed by the processors 51 and 61. The memories 52 and 62 may be located inside or outside the processors 51 and 61, and may be coupled to the processors 51 and 61 by using various well-known means.

Although a series of steps or blocks of a flowchart are described in a particular order when performing methods in the aforementioned exemplary system, the steps of the present invention are not limited thereto. Thus, some of these steps may be performed in a different order or may be concurrently performed. Those skilled in the art will understand that these steps of the flowchart are not exclusive, and that another step can be included therein or one or more steps can be omitted without having an effect on the scope of the present invention.

Various modifications may be made in the aforementioned embodiments. Although all possible combinations of the various modifications of the embodiments cannot be described, those ordinary skilled in that art will understand possibility of other combinations. Therefore, the present invention is not intended to be limited to the embodiments shown herein but is to be accorded the widest scope consistent with the principles and novel features disclosed herein.

The invention claimed is:

1. A communication method using multiple carriers of a user equipment in a multiple-carrier system, the method comprising:
configuring a primary carrier;
acquiring multi-carrier control information for monitoring a control channel of a secondary carrier, the multi-carrier control information being acquired through a physical downlink control channel (PDCCH) of the primary carrier, the multi-carrier control information being included in a master information block (MIB) or system information block (SIB) of system information (SI) transmitted through the PDCCH, a dedicated radio network temporary identifier (RNTI) being used to identify the multi-carrier control information among other control information transmitted through the PDCCH, the multi-carrier control information including monitoring information related to a resource for monitoring the control channel of the secondary carrier, the monitoring information indicating a location or size of the resource for the monitoring the control channel of the secondary carrier; and
monitoring the control channel of the secondary carrier according to the multi-carrier control information.

2. The method of claim 1, wherein a carrier that acquires a synchronization signal is configured as the primary carrier.

3. The method of claim 1, wherein the primary carrier is configured while a random access procedure is performed with respect to a base station.

4. The method of claim 1, wherein the primary carrier is configured under an instruction of a base station.

5. The method of claim 1, wherein the multi-carrier control information further includes information related to an existence of the secondary carrier.

6. A user equipment, comprising:
- a radio frequency (RF) unit configured to transmit and receive a radio signal; and
- a processor coupled to the RF unit, configured to:
  - configure a primary carrier;
  - acquire multi-carrier control information for monitoring a control channel of a secondary carrier; and
  - monitor the control channel of the secondary carrier according to the multi-carrier control information,
  - wherein the multi-carrier control information is acquired through a physical downlink control channel (PDCCH) of the primary carrier,
  - wherein the multi-carrier control information is included in a master information block (MIB) or system information block (SIB) of system information (SI) transmitted through the PDCCH,
  - wherein a dedicated radio network temporary identifier (RNTI) is used to identify the multi-carrier control information among other control information transmitted through the PDCCH,
  - wherein the multi-carrier control information includes monitoring information related to a resource for monitoring the control channel of the secondary carrier, and
  - wherein the monitoring information indicates a location or size of the resource for the monitoring the control channel of the secondary carrier.

* * * * *